United States Patent
Moore et al.

(10) Patent No.: US 6,872,070 B2
(45) Date of Patent: Mar. 29, 2005

(54) U-TUBE DIFFUSION FLAME BURNER ASSEMBLY HAVING UNIQUE FLAME STABILIZATION

(75) Inventors: Edward E. Moore, Prescott, AZ (US); John A. Marino, Lebanon, PA (US)

(73) Assignee: Hauck Manufacturing Company, Lebanon, PA (US)

( * ) Notice: Subject to any disclaimer, the term of this patent is extended or adjusted under 35 U.S.C. 154(b) by 0 days.

(21) Appl. No.: 10/301,329

(22) Filed: Nov. 21, 2002

(65) Prior Publication Data

US 2003/0235798 A1 Dec. 25, 2003

Related U.S. Application Data

(63) Continuation-in-part of application No. 09/853,135, filed on May 10, 2001, now abandoned.

(51) Int. Cl.[7] .............................. F23M 3/04; F23M 9/00
(52) U.S. Cl. ............................ 431/9; 431/10; 431/183; 431/187; 431/215; 431/353; 126/91 A; 165/184
(58) Field of Search ............................... 431/9, 10, 181, 431/187, 183, 353, 215, 118, 116; 126/91 A; 165/184

(56) References Cited

U.S. PATENT DOCUMENTS

| | | | | |
|---|---|---|---|---|
| 943,927 | A | * 12/1909 | Gehring et al. | ............. 239/402 |
| 2,480,547 | A | * 8/1949 | Caracristi | ................... 431/188 |
| 3,570,471 | A | 3/1971 | Lazaridis | |

(Continued)

FOREIGN PATENT DOCUMENTS

| | | |
|---|---|---|
| DE | 28 06 652 A1 | 8/1978 |
| EP | 0 243 506 A1 | 5/1987 |
| EP | 0 736 732 A1 | 10/1996 |
| GB | 2 133 527 A | 7/1984 |

Primary Examiner—Ira S. Lazarus
Assistant Examiner—James G. Barrow
(74) Attorney, Agent, or Firm—McNees Wallace & Nurick LLC

(57) ABSTRACT

A U-tube diffusion flame burner assembly having improved flame stabilization with no undesirable acoustic effects. The burners are axial units comprised of flame holders and combustors. The flame holders includes secondary air tubes to support the flow of secondary air that have helical walls forming helical passageways along at least a portion of its inner diameter to impart a swirl to the secondary air. The helical passageways impart a swirl to the secondary air exiting the passageways while simultaneously acting as a heat exchanger to heat primary air. The flame holders includes fuel tubes having first ends connected to a fuel supply and second flame ends. A plurality of radially oriented apertures are located at the second flame ends to distribute fuel in a radial direction. Primary air tube surrounds at least the flame ends of the fuel tubes and extend axially from first air supply ends to second flame ends. Air is diverted from air supply ends of the flame burners into primary air tubes through radial apertures located at the first air supply ends of the primary air tubes. Secondary air tubes surround the primary air tubes extending from first air supply ends to second ends opposite the air supply, the secondary air tubes having inner diameters larger than the outer diameters of the primary air tubes. The secondary air tubes extend for a preselected distance beyond the second flame ends of the primary air tubes and are coupled to axially-oriented conical-shaped reducers. Flame at high velocity exits the restricted end of the reducers.

55 Claims, 7 Drawing Sheets

U.S. PATENT DOCUMENTS

| | | | | |
|---|---|---|---|---|
| 3,990,860 A | * | 11/1976 | Fletcher et al. | 428/404 |
| 4,044,797 A | * | 8/1977 | Fujie et al. | 138/38 |
| 4,130,389 A | * | 12/1978 | Kaburagi et al. | 431/183 |
| 4,131,459 A | * | 12/1978 | Fletcher et al. | 419/13 |
| 4,366,859 A | * | 1/1983 | Keyes | 165/184 |
| 4,380,173 A | | 4/1983 | Wozniak | |
| 4,438,807 A | * | 3/1984 | Mathur et al. | 165/133 |
| 4,493,309 A | * | 1/1985 | Wedge et al. | 431/116 |
| 4,660,630 A | * | 4/1987 | Cunningham et al. | 165/133 |
| 4,673,350 A | * | 6/1987 | Collier | 431/353 |
| 4,705,022 A | * | 11/1987 | Collier | 126/91 A |
| 4,784,600 A | * | 11/1988 | Moreno | 431/9 |
| 4,856,492 A | * | 8/1989 | Kawamoto | 126/91 A |
| 4,895,513 A | * | 1/1990 | Subherwal | 431/328 |
| 5,207,211 A | | 5/1993 | Hanning et al. | |
| 5,241,949 A | * | 9/1993 | Collier | 126/91 A |
| 5,259,755 A | | 11/1993 | Irwin et al. | |
| 5,263,849 A | | 11/1993 | Irwin et al. | 431/6 |
| 5,505,615 A | * | 4/1996 | Witteveen | 431/182 |
| 5,511,970 A | | 4/1996 | Irwin et al. | 431/9 |
| 5,655,599 A | * | 8/1997 | Kasprzyk | 165/133 |
| 5,700,143 A | | 12/1997 | Irwin et al. | 431/284 |
| 5,749,721 A | * | 5/1998 | Klinge et al. | 431/328 |
| 5,887,583 A | | 3/1999 | Irwin et al. | 126/343.5 A |
| 5,931,657 A | | 8/1999 | Klouda et al. | 431/181 |
| 5,968,378 A | | 10/1999 | Jensen | 219/121.43 |
| 6,024,083 A | * | 2/2000 | Smirnov | 126/91 A |
| 6,027,333 A | * | 2/2000 | Fujii et al. | 431/215 |
| 6,033,208 A | * | 3/2000 | Wunning | 431/215 |
| 6,123,542 A | * | 9/2000 | Joshi et al. | 431/183 |
| 6,142,765 A | * | 11/2000 | Ramaseder et al. | 431/9 |
| 6,179,608 B1 | | 1/2001 | Kraemer et al. | 431/9 |
| 6,190,159 B1 | | 2/2001 | Moore et al. | 431/11 |
| 6,210,151 B1 | * | 4/2001 | Joshi et al. | 431/8 |
| 6,533,030 B2 | * | 3/2003 | Mitrovic et al. | 165/184 |

* cited by examiner

U-TUBE DIFFUSION FLAME BURNER ASSEMBLY HAVING UNIQUE FLAME STABILIZATION

CROSS-REFERENCE TO RELATED APPLICATIONS

This Application is a continuation-in-part of application Ser. No. 09/853,135, filed May 10, 2001 now abandoned.

FIELD OF THE INVENTION

The present invention is generally directed to a gas burners using a diffusion flame with a unique flame stabilization method and specifically to a burner system for a U-tube type burner using self-recuperative radiant tube burners.

BACKGROUND OF THE INVENTION

Diffusion flame (nozzle mixing) gas burners are used in various industrial kilns and furnaces. There are various types of units used in such furnaces, including but not limited to self-recuperative single-ended radiant tube burners. These burners have flame contained within the tube, which tube then radiates heat into the furnace. The units are designed so that no products of combustion enter the work processing chamber of the furnace. Substantially all of the products of combustion are exhausted rearward through the burner outside of the work processing chamber of the furnace and in a direction substantially opposite the flame direction. These exhaust gases preheat the incoming combustion air by extracting waste heat from the hot exhaust gases.

Diffusion flame burners such as self-recuperative single-ended radiant tube burners must have excellent flame stabilization. If the flame front is not anchored at a fixed start location, undesirable acoustics will develop in the tube. Self-recuperative burners additionally have an effective built-in heat exchanger to transfer waste heat from the exhaust gas to the incoming combustion air. These burners typically have an axial design comprised of a flame holder and an inner flame tube. The flame holder provides fuel through a central fuel tube. Primary air to support combustion of the fuel is provided at a low velocity along a first passageway coaxial with the central fuel tube. The primary air distributes fuel as the fuel exits the central fuel tube where it is spark-ignited. Secondary air is provided at greater volumes along a second passageway coaxially with the first passageway to mix with uncombusted fuel in a combustor to provide a flame. The secondary air is separated from the primary air by a tube whose tube wall forms a boundary between the primary air and the secondary air. The secondary air may be provided at higher pressure or at higher velocities or both. As the secondary air combines with the unmixed fuel, it is projected from a reducer at high velocities into the inner flame tube, which is located axially downstream from the reducer. The mixing of the primary air and the fuel is completed in the inner flame tube which heats the industrial furnace or kiln. An exemplary self-recuperative radiant tube burner is set forth in U.S. Pat. No. 4,705,022 to Collier.

Another type of burner assembly is a radiant tube burner with two legs, and a semi-toroidal linking section, commonly referred to as "U-tubes" because the tube is in the shape of an elongated "U." The traditional method of U-tube design is to place the burner at one end of the tube and the recuperator at the other end of the tube. The usual result from this design is that the firing leg of the tube operates at a higher temperature than the exhaust leg of the tube as the energy of the flame is dissipated down the firing leg of the tube.

Various design changes have been introduced into burner designs to improve the combustion of the burners or to reduce $NO_x$ emissions from the burners. One such design improvement is set forth in U.S. Pat. No. 5,700,143 ('143 patent) to Irwin et al. and assigned to the assignee of the present invention. The complex tube design set forth in the '143 patent swirls secondary air by introducing it into the secondary tube through spin vanes where a spin is imparted. The swirling air exits the secondary tube at the end of the primary air nozzle or slightly upstream of the primary air nozzle. The swirling secondary air assists in atomizing the fuel from the fuel/air mixture.

While the burner set forth in the '143 patent is particularly effective in permitting a change from one fuel to another, it is complex and expensive, but can introduce undesirable acoustics.

A difficulty that can be encountered by burners that rely on swirling air to improve mixing is that the secondary air is introduced and swirled at a first end, but exits the secondary tube at a second end. Under steady state conditions, the swirl imparted to the air appears to be stable. The swirling air modifies the acoustics of the burner, producing undesirable acoustics that are very unpleasant, and potentially damaging noise, to anyone in the vicinity. Additionally, with changing conditions as the air flow is modified, the effects within the tube can change the nature of the swirl, causing the flame to be unstable. In certain extreme situations, this can impact the combustion process, such as by extinguishing the flame.

Another problem associated with burners is efficiency. The efficiency of the burners can be improved as the temperature of the secondary air is increased. In radiant burners such as the one described in the '143 patent as well as other burners, the secondary air is frequently used to cool the metallic parts that comprise the burner, as the elevated temperatures of combustion can destroy these parts, if adequate cooling is not provided. Of course, the secondary air is also heated, but this effect is limited by the heat transfer characteristics of the assembly.

Another problem that impacts upon burners, as noted above, is flame stabilization. If the flow of secondary air is altered, either by increasing or decreasing air flow, it is possible to move the flame front and/or extinguish the flame that exists at the juncture of the primary air tube and fuel tube. Thus care must taken when adjusting air flow so as not to extinguish the flame.

What is needed is a diffusion flame burner that can provide a swirling component to secondary combustion air in a manner to stabilize the flame over a broad range transient conditions, and that does not produce undesirable acoustic effects. The burner should also allow changes in secondary air flow without destabilizing the flame. It should also heat the secondary combustion air to improve the efficiency of the combustion process. The burner should also be able to be used with retrofitted U-tube radiant burners or newly installed U-tube radiant burners. The diffusion flame burner of the present invention should be a simple design to construct, and should be resistant to damage resulting from long exposures to heat, high temperature and flame.

SUMMARY OF THE INVENTION

The present invention is a diffusion flame burner having improved flame stabilization with no undesirable acoustic effects. The burner is an axial unit comprised of a flame holder and combustor. In a single-ended, self-recuperative radiant tube burner, the flame holder and combustor are axially coupled to an inside flame tube. As defined herein, the term "self-recuperative" refers to burners that are entirely self-recuperative and at least partially self-recuperative. The flame tube is surrounded by the outer radiant tube. The flame holder includes a secondary air tube to support the flow of secondary air that has helical walls forming helical passageways along at least a portion of its inner diameter to impart a swirl to the secondary air. The helical passageways impart a swirl to the secondary air exiting the passageways while simultaneously acting as a heat exchanger to heat primary air.

The flame holder mechanism of the present invention comprises a fuel tube having a first end connected to a fuel supply and a second flame end. A plurality of radially oriented apertures are located at the second flame end to distribute fuel in a radial direction. A primary air tube surrounds at least the flame end of the fuel tube. The primary air tube extends axially from a first air supply end to a second flame end. Air is diverted from an air supply end of the flame burner into the primary air tube through a radial aperture located at the first air supply end of the primary air tube.

The secondary air tube surrounds the primary air tube extending from a first air supply end to a second end opposite the air supply, the secondary air tube having an inner diameter larger than the outer diameter of the primary air tube. The secondary air tube in turn is surrounded by an exhaust gas housing, which, in its simplest form is in the shape of a tube, the inner diameter of which is larger than an outer diameter of the secondary air tube. An annulus is formed between the inner diameter of the exhaust gas housing and the outer diameter of the secondary air tube, the gap size dictated by the differences in the two diameters. The secondary air tube extends for a preselected distance beyond the second flame end of the primary air tube and is coupled to an axially-oriented conical-shaped reducer, the conical-shaped reducer having a first opening at a first end where it is coupled to the secondary air tube and a second restricted opening at a second end opposite the first end of the reducer. The portion of the secondary air tube beyond the flame end of the primary air tube and the conical-shaped reducer constitute the combustor and the volume within this region supports combustion. Flame at high velocity exits the restricted end of the reducer.

When the diffusion flame burner is a single-ended self-recuperative radiant tube burner, flame exiting the restricted end of the conical-shape reducer then enters an inner flame tube to which it is coupled. The inner flame tube extends in an axial direction beyond the reducer, having a first end adjacent the reducer and a second end opposite the reducer. The inner flame tube is surrounded by an outer radiant tube, the outer radiant tube having an inner diameter larger than an outer diameter of the inner flame tube, with an annular space formed therebetween.

The helical walls located on the inside diameter of the secondary air tube act as an air swirl to deliver the secondary air to the combustor with a predetermined swirl, the swirl determined by the pitch of the helical walls. This air swirl forms a plurality of standing vortices in pockets of the helical passageways at the second end of the secondary air tube. This plurality of standing vortices impart stability to the flame. Even when one or more of these standing vortices are temporarily extinguished, the flame is perpetuated by remaining vortices, which reignite the extinguished vortices once they are re-established. The walls which project inward from the inside diameter of the secondary air tube additionally act as an efficient heat exchanger, the helical walls serving as fins to effect efficient heat transfer from hot exhaust gases flowing in the exhaust gas housing annulus, formed between the outer diameter of the secondary air tube and the inner diameter of the exhaust gas housing, and the secondary air tube.

Another application of the present invention is the use of the diffusion burner flame stabilization device in a burner with two legs. Typically, the two legs comprise each of the legs of a U-tube burner assembly. The burner of the present invention is able to function in a retrofitted U-tube burner assembly. Prior art U-tubes generally have a burner at one end of the U-tube and a recuperator at the other end of the tube, with fuel being burned in the burner and the hot gases of combustion being forced along the U-tube and exhausted from the recuperator. The old burner and recuperator can be removed from the U-tube and retrofitted with the burners of the present invention. Two burners of the present invention can be inserted into each end of the U-tube so that burners are firing at both ends of the tube. As the U-tube has three housing elements, two substantially parallel, linear tube elements joined by a semi-toroidal tube element, one burner can fit into each leg of the U-tube.

In some cases, the housing elements are a unitary housing element. In other cases, the U-tube housing elements are separate elements that are mechanically or metallurgically joined. As each burner fires, a portion of the hot gases of combustion are forced forward toward the other end of the U-tube housing, while a second portion of the hot gases of combustion are forced back toward the burner which produced the gases. In the U-tube burner assembly of the present invention, the pressure in the tip of the "U" portion of the tube, namely the semi toroidal element, is generally zero or negative at normal operating conditions, as the pressure from the hot gases of combustion are generally equivalent.

In the U-tube assembly, only a portion of the combustion gases generated by each burner are expelled through the recuperator of the respective burner. The other portion of the hot gases of combustion are processed through the recuperator of the burner at the other opposite leg of the U-tube. However, the entire U-tube assembly using the burners of the present invention is completely self-recuperative, as all of the hot gases of combustion are used to heat the incoming gas and air flows prior to combustion. In normal operating conditions, half of the hot gases of combustion are being generated by each burner. As the hot gases of combustion are somewhat equally distributed along the length of the U-tube, the U-tube assembly of the present invention has a much more consistent heat transfer along its length. In addition, the burner of the present invention can be used with newly manufactured U-tubes in the same manner as set forth above.

Certain U-tube assemblies have inner housing tube cross-sectional areas, or inner diameters, that are not amenable to the use of the burner and flame stabilization device of the present invention because the velocity of the hot gases of combustion created by the burner travel too slowly through the housing to adequately transfer heat from the hot gases of combustion to the air and gas flowing into and through the burner. At normal steady state operating conditions, if the hot gases of combustion are moving too slowly, the heat transfer between the hot gases of combustion and the air and fuel inflow is insufficient to properly preheat the air and fuel inflow prior to combustion. In these assemblies, sleeves are inserted into the housing to reduce the cross-sectional areas of the tubes thereby accelerating the flow of the hot gases. The sleeve may be a metal, a ceramic, or combination thereof.

The present invention is also a self-recuperative radiant tube burner assembly with improved flame stability comprising a U-tube housing having a first substantially linear tube housing element, a second substantially linear tube housing element and a toroidal tube housing element, where the first housing element has a first and a second end, where the second housing element has a first and a second end, where the third toroidal housing element has a first end and a second end, the second end of the first housing element being joined to the first end of the toroidal housing element, the second end of the second housing element being joined to the second end of the toroidal housing element, the U-tube housing having a central axis extending between the first end of the first housing element and the first end of the second housing element. The self-recuperative radiant tube burner assembly of the present invention also comprises two flame holders for a diffusion flame burner, each flame holder having a first end and a second end. The self-recuperative radiant tube burner assembly of the present invention also comprises a first flame holder positioned in the first end of the first housing element and a second flame holder positioned in the first end of the second housing element, where the first flame holder has a first inner flame tube axially spaced from the second end of the flame holder by a gap and is positioned at the second end of the first housing element. The second flame holder has a second inner flame tube axially spaced from the second end of the first flame holder by a gap and is positioned at the second end of the second housing element.

An advantage of the present invention is that it provides a more efficient combustion of the fuel as the secondary air is heated to provide a recuperative effect. Thus, the air from the secondary air tube is provided to the combustor at a higher temperature than if there were no recuperative effect. The walls of the secondary air tube act as a heat exchanger to more efficiently transfer heat to the secondary air and heat it to higher temperatures than heretofore possible.

Another advantage of the present invention is that it provides a more stable flame. The air is swirled in such a manner as to stabilize the flame within the recirculation zone, allowing combustion to continue even under transient conditions of secondary air flow, without concern about flame extinguishment as a result of the formation of a plurality of stationary vortices. The design of the unit does not produce undesirable acoustic effects normally associated with diffusion flame gas burners that incorporate swirled air.

Another advantage of the present invention is that it can perform at higher operating temperatures by delivering secondary air preheated to higher temperatures than similar self-recuperative burners.

Another advantage of the present invention is that it is resistant to thermal shock, so that it can undergo extreme temperature changes in short periods of time without suffering adverse effects.

A further advantage of the present invention is that it is able to be retrofitted into pre-existing U-tube burners after the burner and recuperator present in the U-tubes have been removed, which allows burners to fire at both ends of the U-tube. As both ends of the U-tube are burners, the heat transfer along the length of the U-tube within the furnace is more equally distributed than in standard prior art U-tube.

A further advantage of the present invention is that it is able to be used with newly manufactured U-tube housings.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
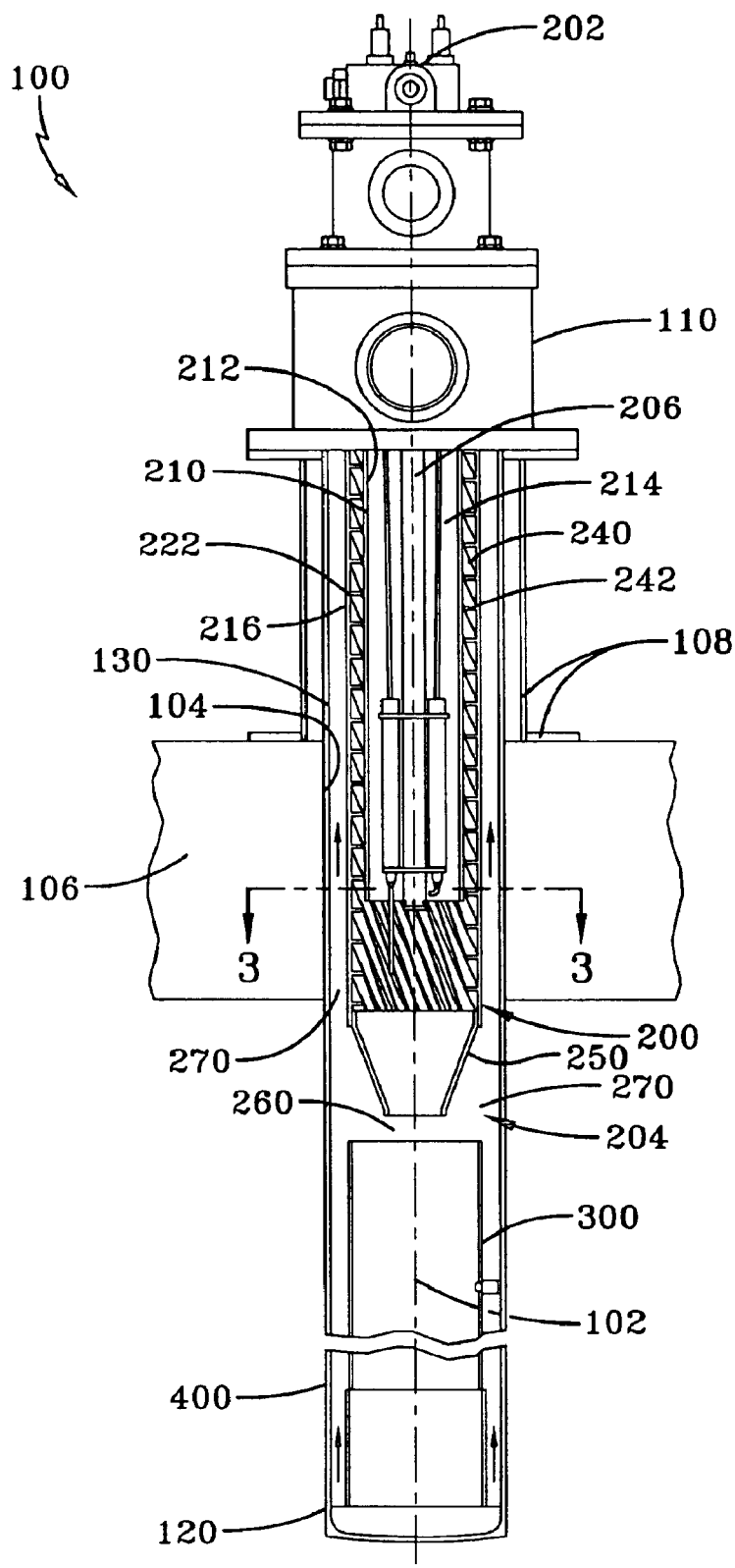
FIG. 1 is a cross-sectional view of the radiant tube burner of the present invention extending through a furnace wall.

FIG. 1 depicts the present invention included as a flame holder and combustor in a self-recuperative single-ended radiant tube burner. Self-recuperative burners require an effective built-in heat exchange to transfer heat which is otherwise lost as waste form the exhaust gas to the incoming combustion air. Ideally, the flame retaining mechanism and the heat exchanger should be as simple in construction as possible while also being resistant to heat and flames. Referring now to FIG. 1, the self-recuperative, single-ended radiant tube burner 100 of the present invention includes a central axis 102 and is comprised of a flame holder 200 and an inner flame tube 300. The self-recuperative, single ended radiant tube burner 100 has a first end 110, a second end 120 and an exhaust housing 130 that extends between the first end 110 and the second end 120. Housing 130 extends through an aperture 104 in a furnace wall 106. The portion of housing 130 extending through furnace wall 106 is referred to as outer radiant tube 400 and may be constructed integral with exhaust housing 130 or as a separate piece assembled to housing 130. A support structure 108 extends between the first end 110 of radial tube burner 100 and furnace wall 106 firmly attaches and stabilizes burner 100 to furnace wall 106. A flame (not shown in FIG. 1) is generated within self-recuperative single-ended tube burner 100 and heat is radiated from radiant tube 400 positioned within the furnace or kiln.

Flame holder 200 has a first end 202 that extend within exhaust gas housing 130 from the first end 110 of burner 100 and terminates at a second end 204 within exhaust gas housing 130. Flame holder 200 comprises a fuel tube 206 that extends from the first end 110 of tube burner 100 and, as shown in FIG. 1, is substantially coaxial with burner 100. A primary air tube 210 surrounds fuel tube 206. The inside diameter 212 of primary air tube 210 is larger than the outside diameter of fuel tube 206, so that a natural passageway 214 is formed between fuel tube 206 and inside diameter 212. Fuel is provided to fuel tube 206 by means of a connection to a fuel supply (not shown) at first end 110 of burner 100. Passageway 214, also referred to as the primary air passageway, supplies air to mix with fuel from fuel tube 206, which is supplied from first end 110 of burner 100. Primary air tube 210 terminates within flame holder 200. A secondary air tube 222 has an outside diameter 216 surrounding tube 210 and extends beyond tube 210. Fuel tube 206 terminates within flame holder 200 just beyond primary air tube 210. Fuel tube 206 includes a plurality of apertures 220 having at least a partial radial orientation to form a nozzle that distribute fuel inside tube 210, best illustrated in FIG. 2, an enlarged section of the second end 204 of flame holder 200.

Figure 2:
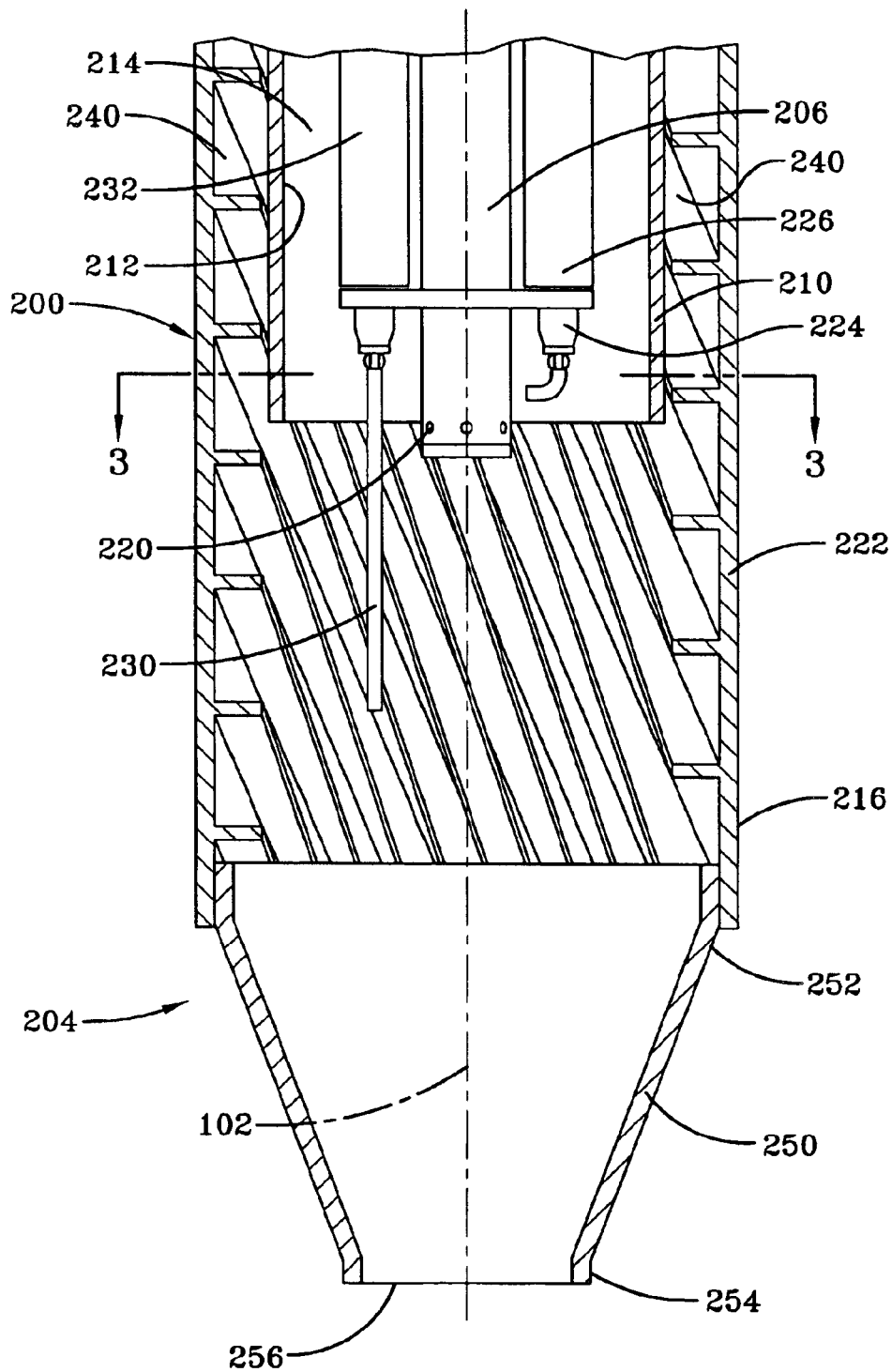
FIG. 2 is an enlarged cross-sectional view of the second end of the flame holder of the present invention.

Referring now to FIG. 2, a spark initiator 224 in the form of a spark plug is positioned proximate to fuel tube 206. The spark initiator 224 is connected to a power source to provide the requisite voltage by means of wiring (not shown) carried inside first protective tube 226 that extends toward first end 110. A flame sensor 230 extends beyond the termination of tube 210. Flame sensor 230 is connected to an indicator, preferably on a control panel (not shown) by means of wiring (not shown) carried inside second protective tube 232 that extends toward first end 110. Conveniently, a single protective tube may be used to carry the wiring if desired. Primary cooling air transported along passageway 214 cools the electrical wiring in the protective tubes.

As depicted in the preferred embodiment of FIG. 1, the central axis of fuel tube 206 is coincident with burner central axis 102, but this geometric configuration is not required. The only requirement is that the fuel tube must deliver fuel proximate to primary air and spark initiator.

Combustion is initially started by injecting a fuel from the plurality of apertures 220 forming a nozzle while simultaneously supplying air along primary air tube 214. Ignition is initiated by supplying an ignition voltage at spark initiator 224, a spark plug. An electric spark from the spark plug having its sparking electrode extending into the fuel stream causes an ignition of the fuel-air mixture. After ignition, combustion normally is a self-sustaining process, as long as the fuel and air feed the combustion flame. Flame sensor 230 detects the presence of a flame and, via appropriate indication, when the flame has been extinguished.

Referring again to FIG. 1, secondary air tube 222 includes a plurality of channels 240 that extend along its length. These channels are formed by helical walls 242 that extend inward from tube 222. As best seen in FIG. 2, beyond the termination of primary air tube 210, these walls extend away from secondary air tube 222, projecting inwardly toward the central axis 102 of the burner. These channels form the secondary air passageways 240. The radial inward boundary of these passageways 240 is the outer diameter of primary air tube 210. Air is introduced into the secondary air tube at the first end 110 of radiant burner tube 100. The air is supplied under pressure or it may be injected under pressure, typically from a combustion air blower.

At the second end 204 of flame holder 200 is a conically shaped reducer 250 that acts as a nozzle to discharge the flame. Reducer 250 has a first end 252 that is received within tube 222. A second end 254 of discharge nozzle 250 has an aperture 256 to direct the flame toward the inner flame tube 300. Discharge nozzle 250 can be any desired shape, but in a preferred embodiment shown in FIGS. 1 and 2, is conically shaped to concentrate the flame, increasing the flame velocity as it directs the flame toward inner flame tube 300.

Inner flame tube 300 is located within outer radiant tube 400 receiving flame from reducer 250. Combustion is completed in inner flame tube 300. The hot products of combustion are turned 180° at second end 120 of inner flame tube 300 and flow in a reverse direction toward first end 110 of burner through the annular space or gap 260 between inner flame tube 300 and outer radiant tube 400. A second annular space 270 is present between the flame holder 200 and outer radiant tube 400. The hot products of combustion are turned 180° because the end of outer radiant tube 400 is closed.

The configuration of inner flame tube 300 as depicted in FIG. 1 is conventional. It is located at end 120 of self-recuperative single-ended radiant tube burner 100, receiving the flame from reducer 250 where combustion is completed. Heat is radiated form outer radiant tube 400 into the vessel that is being heated, for example a kiln or industrial furnace. The flame may expand as it is projected from discharge nozzle into inner flame tube 300 and any additional combustion may be completed as any uncombusted fuel and air combine in this portion of the burner prior to discharge into the vessel.

As shown in FIG. 1, secondary air tube 222 is formed with a plurality of helical channels 240 formed by helical walls 242 that serve as a conduit for secondary air. These helical walls 242 form closed channels 240 that are bounded passageways when a primary air tube 210 is inserted within secondary air tube 222. The helical walls extend beyond the termination of primary air tube 210. The helical walls 242 essentially act as heat exchanger fins along their entire length. Below the termination of primary air tube 210, the helical channels are no longer completely bounded passageways. It will be understood by those skilled in the art that although the combustor is shown comprising three elements, a primary air tube 210, a secondary air tube 222 having helical walls, and a reducer, these elements may be combined to form a single piece or as a single tube having the requisite characteristics coupled to a reducer.

Air is introduced into the channels at preselected location at the first end 110 of self-recuperative single-ended tube burner 100. The air may be introduced axially or radially. The method of introduction of air is not a part of this invention. However, as exhaust gases exit the burner at first end 110, air may be introduced in any satisfactory manner that does not interfere with the discharge of exhaust gases. The air enters helical channels 240 which run the length of tube 222 in the preferred embodiment. It will be understood that the helical channels are not required to extend the entire length of tube 222 to be effective, nor are the walls 242 required to extend the entire length of tube 222. However, as the walls 242 act as fins, a maximum of efficiency is obtained when they extend the entire length of tube 222. Other configurations of the walls 242 and channels 240 are within the scope of the invention.

Figure 3:
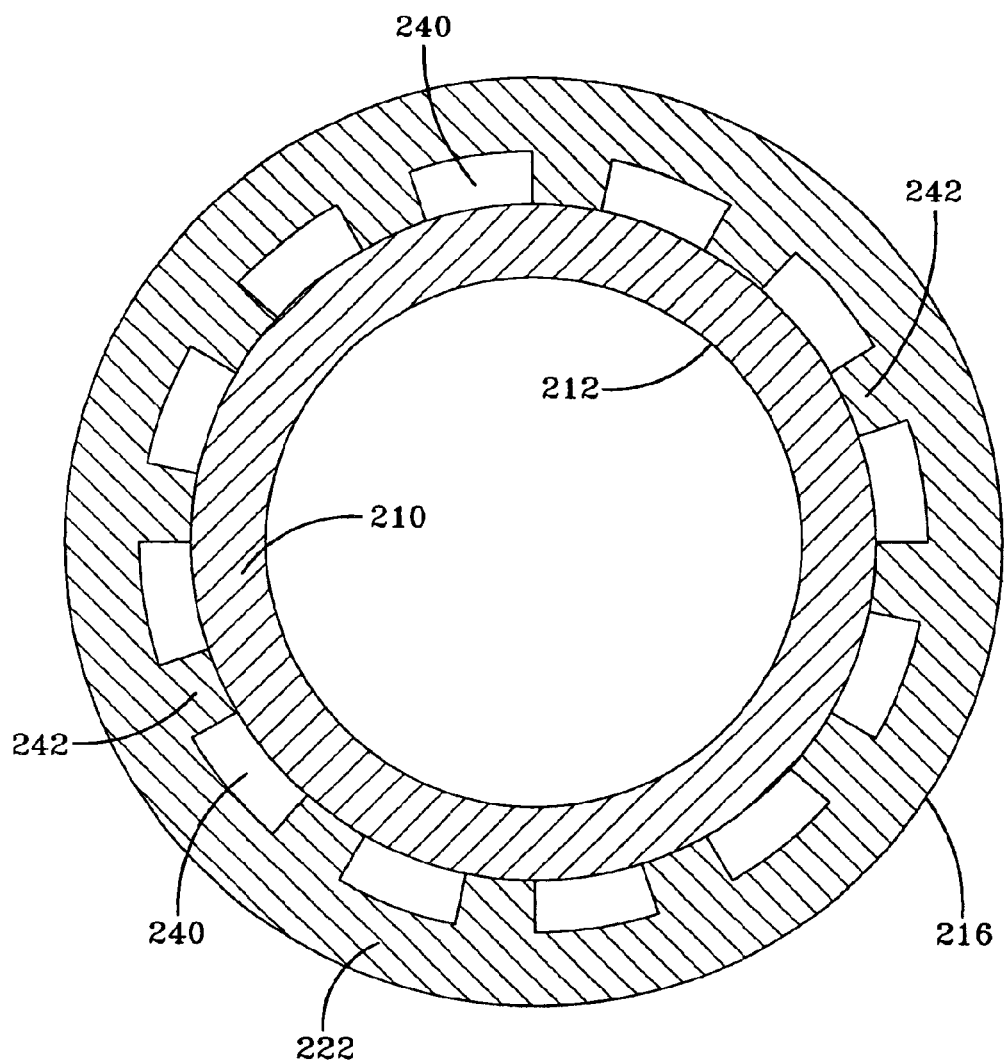
FIG. 3 is a cross-section of the tube extending inside the radiant tube burner before the termination of its inside diameter, depicting the bounded channels.

FIG. 3 represents a cross-section of primary air tube 210 and secondary air tube 222 to better illustrate passageways 240. This cross-section is located above the combustor portion of the flame holder, that is, between the end of inside diameter 212 and first end 110 (not shown in FIG. 3). As can best be seen from FIG. 3, tube can be made as a monolithic material, with walls 242 formed integrally into tube. FIG. 3 illustrates clearly the bounded nature of channels 240 in this portion of tube. As a cross-section, FIG. 3 does not illustrate the helical aspects of channels 240 and walls 242.

Figure 4:
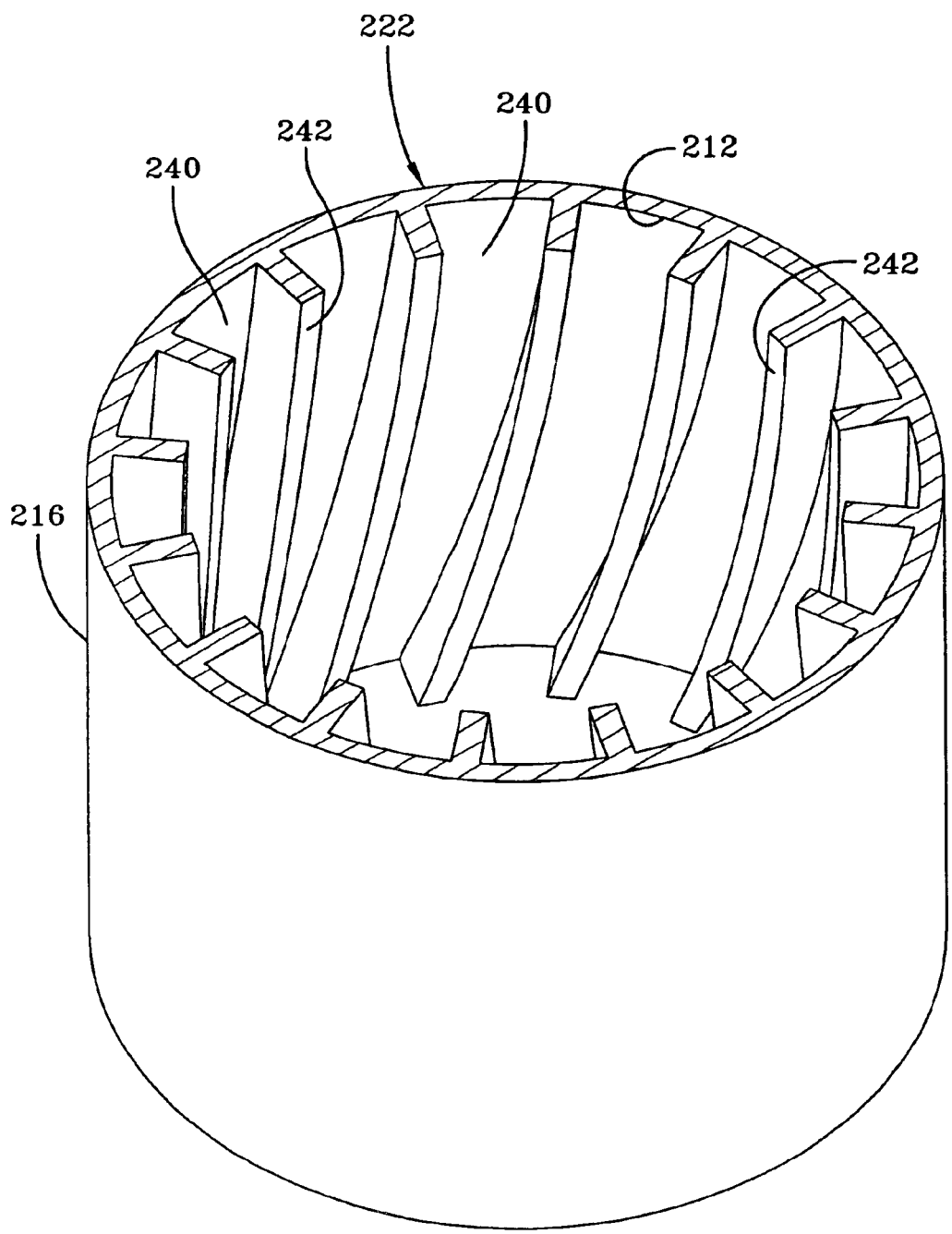
FIG. 4 is a schematic of the tube extending inside the radiant tube burner after the termination of its inside diameter depicting the helical configuration and unbounded channels.

FIG. 4 is a schematic view of secondary air tube 222 in the combustor portion of flame holder immediately preceding reducer 250. After air from first end 110 (not shown in FIG. 4) is introduced into helical channels, it is transmitted along the length of tube 222. The air is imparted with a swirl, that is, in addition to a velocity in the axial direction of the tube, the air also has a velocity in the circumferential direction, or with a tangential component. In a preferred embodiment, the pitch on the helical walls is between about one turn in 12" and one turn in 20'. As the air exits the passageways beyond the termination of primary air tube 210 (not shown in FIG. 4), where fuel is injected into the air flow established by helical walls 242, a flame front is established stabilized by the swirl of air by helical channels 240 and the bluff bodies made by the walls of the fins. Airflow over the walls 242 plus the swirl imparted to the air by the helical channels cause a plurality of flame vortices to form within the valleys between the walls 242. These flame vortices or flamelets are substantially stationary. These flamelets ignite the balance of the faster moving air-gas mixture thereby providing stabilization to the flame as it accelerates through the orifice or aperture 256 of reducer 250. The flamelets provide stabilization to the flame front since even if one or more are temporarily extinguished by transient conditions, others remain to perpetuate the main flame until steady state conditions are re-established and the extinguished flame vortices are reformed.

Secondary air tube 222 as well as other burner parts exposed to flame or high temperature exhaust gas such as reducer 250, other radiant tube 400, primary air tube 210, exhaust gas housing and inner flame tube 300 are ideally manufactured of a material that has good heat transfer properties and that is thermally shock resistant, but which is suitable for continued use in an oxidative environment at sustained temperatures as high as about 2400° F. While oxidation-resistant high temperature metallic alloys may be used, such as high temperature stainless steels or high temperature superalloys, particularly alloys that have been coated with protective coatings for additional oxidation, corrosion and/or thermal protection, ceramic materials that are capable of being manufactured as tubes of the above configuration are preferred. Some of these ceramic materials may be ceramic composites that may be coated to improve their thermal properties or their oxidation resistance. A carbon-carbon material that has been coated with a protective coating is an example. Alumina may also be used, however, it does not have optimal thermal and conductive properties, and its use is limited to conditions in which the burner does not require thermal shock resistance. However, the preferred material is siliconized silicon carbide, also referred to as Si/SiC ceramic. A protective coating may be added to this tube, but it is not necessary. Another acceptable material is cordierite.

Tube 222 may be of any desired length, its length being dictated by the operating requirements for the radiant tube burner into which it is to be fitted. In a preferred embodiment, the wall thickness of the tube may vary from less than about ⅛" to about ½", measured away from walls 242. More preferably, the wall thickness is in the range of ⅛" to about ¼". This radial thickness of the walls 242 in a preferred embodiment is about ⅛", but may be increased or decreased based on design considerations dictated by factors such as finite element analysis or manufacturing techniques. This radial thickness also establishes one of the radial channel dimension, so that the tube thickness from the outside diameter to the inside diameter is increased by the radial thickness of the walls when measured at walls 242. The width of the channel, that is, its circumferential dimension between adjacent walls 242, may vary or may remain constant along the axial length of tube 222. Clearly, if the channel size is increased, the flow of air will decrease and the velocity of the flame will be reduced. Channel size can be controlled by controlling the number of walls 242 or the circumferential thickness of the walls. This dimension also preferably is ⅛". Alternatively, as the channel size is decreased, the opposite effect will occur. In a preferred embodiment, the circumferential dimension of channel 240 is two times the wall thickness, or about ¼" when the wall thickness is about ⅛".

The novel aspects of the flame holder mechanism are achieved as the walls 242 on secondary air tube act as an air swirl and as bluff body flame front stabilizers. Fuel is injected radially from the fuel tube 206 into channels 240. Flame is spark ignited using the primary air flowing through the primary air tube. This flame propagates to the fuel and air being mixed in the region of the channels below primary tube 210. The airflow causes standing vortices of fuel/air mixture to form in the channels between the helical fins that, when ignited, form flamelets. These flamelets ignite the balance of the mixing fuel and air and the stable flame exits at high velocity through the restricted nozzle. Instead of the combustion process being dependent on one pilot flame to ignite the fuel, after the initial "lighting" of the flame, the flame can be sustained by one or more of the flamelets, making the flame much more stable.

While the preferred embodiment is described in conjunction as a self-recuperative, single-ended radiant tube burner, the novel aspects of the present invention, particularly the flame stabilization aspects, are not restricted to use with a-self-recuperative, single-ended radiant tube burner and may be used in other types of burners, for example, with a U-tube burner assembly.

Figure 5:
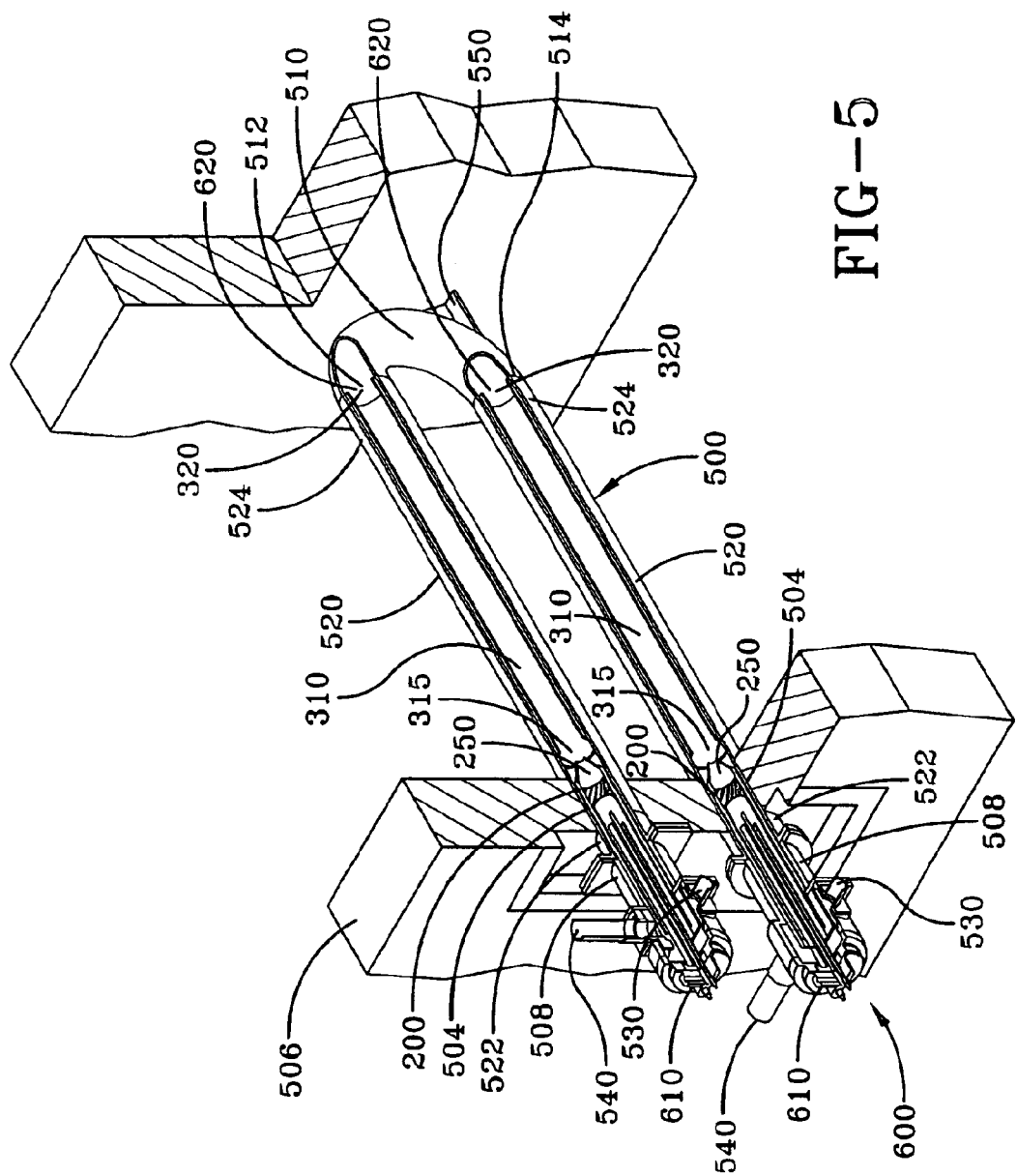
FIG. 5 is a cross-sectional view of two radiant tube burners of the present invention extending through a furnace wall into a U-tube burner.

FIG. 5 depicts a cross-section of the U-tube self-recuperative burner assembly 500 of the present invention. The two self-recuperative, radiant tube burner assemblies 600 are shown fitted into a U-Tube housing, which serves as both the exhaust housing 510, 520 the burner assemblies 600 and as the outer radiant tube of the U-tube burner assembly 500. The housing of the U-tube burner assembly 500 itself comprises two substantially parallel, linear U-tube elements 520, each element 520 having a first end 522 and a second end 524 connected at one end by a semi-toroidal tube element 510, said element having two ends, 512 and 514. These elements are joined together so that the entire U-tube housing forms a hollow elongated "U." These three elements 510 and 520 may be of a unitary construction or the elements 510 and 520 may be separate tubes that are mechanically or metallurgically joined together. The semi-toroidal tube element 510 is physically supported by a brace or bracket 550 in the furnace. Each self-recuperative, radiant tube burner 600 has a first end 610 and a second end 620. In the case of the U-tube assembly, since there are two burner assemblies 600, there are two first ends 610 and two-second ends 620.

The radiant U-tube assembly 500 extends through two apertures 504 in a furnace wall 506. Support structures 508 extend between the first ends 610 of radial tube burners 600 and the first ends of the linear U-Tube elements 522 and firmly attaches and stabilizes burners 600 to the first ends of linear U-tube elements 522. A flame (not shown) is generated within self-recuperative single-ended tube burners 600 and heat is radiated from radiant U-tube elements 510 and 520 positioned within the furnace or kiln. The fuel enters the burners 500 through the fuel inlet lines (not shown) and the air enters the burners through the air inlet lines 530. The exhaust leaves the burners through the exhaust lines 540.

The two elements of the radiant burner assemblies 500 are the flame holders 200 and the inner flame tubes 310. Each burner assembly has a first end 610 and a second end 620. Each inner flame tube has a first open end 315 and a second open end 320. Inner flame tubes 310, are located within U-tube housing elements 520 receiving flame from reducers 250 at the first ends of the inner flame tubes 315. A portion of the hot products of combustion continue out the open end 320 of the inner flame tube 310 (which are also the second ends of linear U-tube elements 524 and the second end of the burner assemblies 620) and into the semi-toroidal tube element 510. A portion of the combustion gases flow in reverse direction toward the first end of the burners through the space created between the inner flame tube 310 and the U-tube element 520.

Some U-tube assemblies have housings that have inner cross-sectional areas that are too large for the proper use of the self-recuperative burners of the present invention. In these burners, because the cross-sectional is too large, the velocity of the combustion gases is slower than is required for proper heat transfer between the hot gases of combustion and the incoming air and fuel. For these U-tube assemblies, it is necessary to fit a metal or ceramic sleeve 272 into the U-tube housings so as to reduce the cross-sectional area of the housing as far as the flame holders extend into the housings so that the space created between flame tube 310 and the U-tube element 520 is also reduced. By reducing the cross-sectional area of the housing, the velocity of the hot gases of combustion is increased to a velocity that enables adequate heat transfer between the hot gases of combustion and the incoming air and fuel. When a sleeve is used to decrease the cross-sectional area of the U-tube element, the combustion gases flow through the space created by the inner flame tube 310 and the sleeve. The sleeve can be used in any design to tailor the size of the space through which combustion gases flow. Because the combustion gases from both burners assemblies 600 are flowing into the semi-toroidal tube element 510, the pressure may be zero or negative in sections of the semi-toroidal tube element 510. Under normal operating conditions the amount of fuel and air that is supplied to the burners 600 will be about equal. Therefore, both burners will be producing about the same amount of combustion gases. Therefore, the volume of combustion gases that is flowing through one end of the toroidal element 512 toward the other end 514 is substantially the same amount of combustion gases that are flowing toward the other way, from end 514 toward end 512. Thus, under normal operating conditions, the volume of combustion gases flowing out each of the exhaust lines 540 is substantially equivalent.

Since the heat transfer of the combustion gases to the furnace are equally generated by the two burners 600, the combustion gases generally distribute more uniformly along the length of the three U-tube elements 510 and 520 than in prior art U-tubes having one burner and one recuperator.

Figure 6:
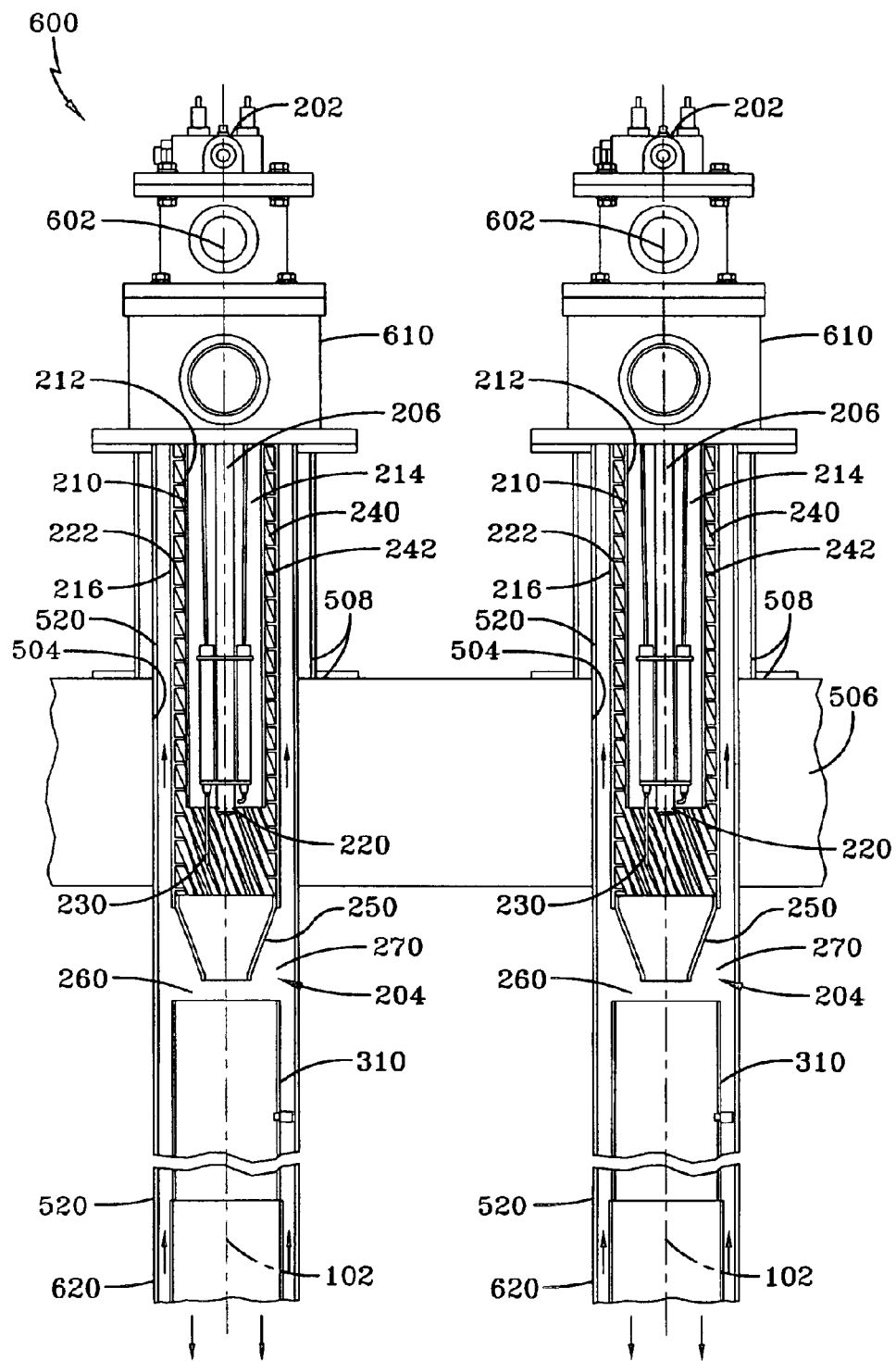
FIG. 6 is a partial section view of two radiant tube burners of the present invention extending into a furnace.

FIG. 6 depicts the present invention included as a flame holder and combustor 600 in each end a self-recuperative radiant U-tube burner. Each self-recuperative radiant tube burner assembly 600 of the present invention includes a central axis 602 and is comprised of a flame holder 200 and an inner flame tube 310. Each self-recuperative radiant tube burner assembly 600 has a first end 610, a second end 620 and a substantially linear U-tube housing element 520 into which the burner assembly 600 is fitted. In retrofitting, the existing U-tube housing element 520 is already installed, as discussed above. The entire U-tube housing comprises three separate elements, a first substantially linear tube housing element 520, a second substantially linear tube housing element 520 and a third toroidal housing element 510, which are shown FIG. 5

Figure 7:
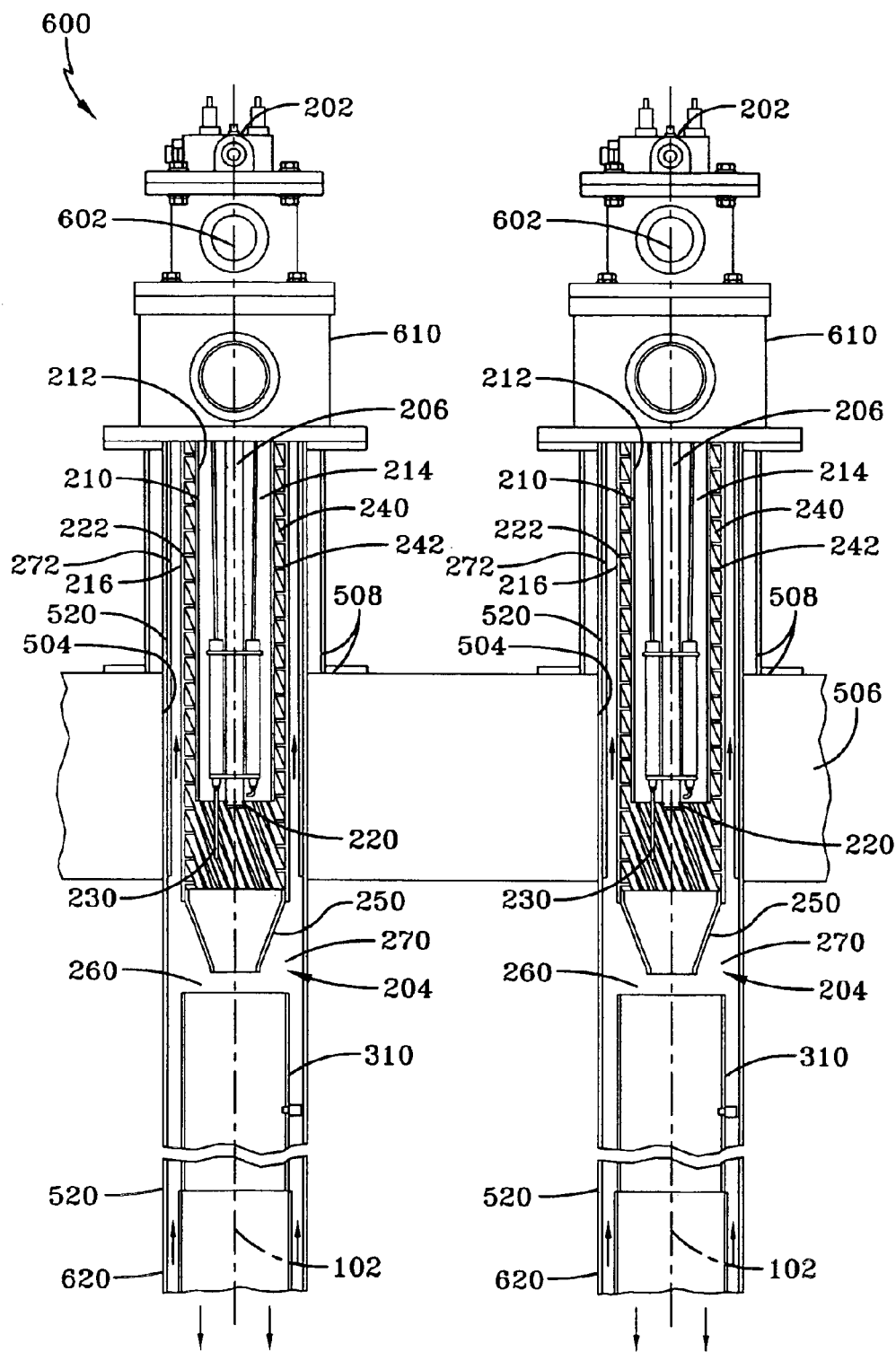
FIG. 7 is a partial section view of an alternate embodiment of two radiant tube burners of the present invention extending into a furnace.

As both U-tube housing elements 520 have substantially identical self-recuperative tube burners assemblies 600, FIG. 5 illustrates the burner assemblies 600 installed in both U-tube housing elements 520. U-tube housing element 520 extends through an aperture 504 in a furnace wall 506. A support structure 503 extends between the first end 610 of radial tube burner 600 and furnace wall 506 firmly attaches and stabilizes burner 600 to furnace wall 506. In an alternative embodiment, support structure 508 extends between the first end 610 of radial tube burner assembly 600 and the end of U-tube housing element 620, which firmly attaches and stabilizes burner assembly 600 to U-tube housing element 520. In another alternative embodiment as shown in FIG. 7, support structure 508 extends between the first end 610 of radial tube burner assembly 600 and the sleeve 272. In addition, U-tube housing elements 520 may have different physical structure, requiring support structures of differing geometries so that any convenient geometry may be used. A flame (not shown in FIG. 5 is generated within self-recuperative tube burner assembly 600 and heat is radiated from the three U-tube housing elements 510 and 520 (as shown in FIG. 5 into the furnace.

Flame holder 200 has a first end 202 that extends within exhaust U-tube housing element 520 from the first end 610 of burner assembly 600 and terminates at a second end 204, typically positioned inside the furnace wall and within U-tube housing element 520. Flame holder 200 comprises a fuel tube 206 that extends from the first end 610 of tube burner assembly 600 and, as shown in FIG. 6, is substantially coaxial with burner assembly 600. A primary air tube 210 surrounds fuel tube 206. The inside diameter 212 of primary air tube 210 is larger than the outside diameter of fuel tube 206, so that a natural passageway 214 is formed between fuel tube 206 and inside diameter 212. Fuel is provided to fuel tube 206 by means of a connection to a fuel supply (not shown in FIG. 5) at first end 610 of burner assembly 600. Passageway 214, also referred to as the primary air passageway, supplies air to mix with fuel from fuel tube 206, which is supplied from first end 610 of burner assembly 600. Primary air tube 210 terminates within flame holder 200. A secondary air tube 222 has an outside diameter 216 surrounding tube 210 and extends beyond tube 210. Fuel tube 206 terminates within flame holder 200 just beyond primary air tube 210. Fuel tube 206 includes a plurality of apertures 220 having at least a partial radial orientation to form a nozzle that distribute fuel inside tube 210, best illustrated in FIG. 2, an enlarged section of the second end 204 of flame holder 200.

As depicted in the preferred embodiment of FIG. 6, the central axis of fuel tube 206 is coincident with burner central axis 602, but this geometric configuration is not required. The only requirement is that the fuel tube must deliver fuel proximate to primary air and spark initiator.

As shown in FIG. 2, combustion is initially started by injecting a fuel from the plurality of apertures 220 forming a nozzle while simultaneously supplying air along primary air tube 214. Ignition is initiated by supplying an ignition voltage at spark initiator 224, a spark plug. An electric spark from the spark plug having its sparking electrode extending into the fuel stream causes an ignition of the fuel-air mixture. After ignition, combustion normally is a self-sustaining process, as long as the fuel and air feed the combustion flame. Flame sensor 230 detects the presence of a flame and, via appropriate indication, when the flame has been extinguished.

Referring back to FIG. 6, secondary air tube 222 includes a plurality of channels 240 that extend along its length.

These channels are formed by helical walls 242 that extend inward from tube 222. As best seen in FIG. 2, beyond the termination of primary air tube 210, these walls extend away from secondary air tube 222, projecting inwardly toward the central axis 602 of the burner. These channels form the secondary air passageways 240. The radial inward boundary of these passageways 240 is the outer diameter of primary air tube 210. Air is introduced into the secondary air tube at the first end 610 of radiant burner tube 600. The air is supplied under pressure or it may be injected under pressure, typically from a combustion air blower.

At the second end 204 of flame holder 200 is a conically shaped reducer 250 that acts as a nozzle to discharge the flame. Reducer 250 has a first end 252 that is received within tube 222. A second end 254 of discharge nozzle 250 has an aperture 256 to direct the flame toward the inner flame tube 310. Discharge nozzle 250 can be any desired shape, but in a preferred embodiment shown in FIGS. 6 and 2, is conically shaped to concentrate the flame, increasing the flame velocity as it directs the flame toward inner flame tube 310.

Inner flame tube 310 is located within U-tube housing element 520 receiving flame from reducer 250. Combustion is completed in inner flame tube 310. Unlike the embodiment set forth in FIG. 1, in which the end of outer radiant tube 400 is closed, not all of the hot products of combustion are turned 180° at second end 620 of inner flame tube 310. Rather, only a portion of the hot products of combustion are turned 180° and flow in a reverse direction toward first end 610 of burner through the annular space or gap 260 between inner flame tube 310 and outer radiant tube (and U-tube housing element) 520. A second annular space 270 is present between the flame holder 200 and U-tube housing element 520. The remaining elements of combustion continue out the open end of inner flame tube 315 and into the third toroidal U-tube element 510 (shown in FIG. 5).

The configuration of inner flame tube 310 as depicted in FIG. 5 is conventional. It is located at end 620 of self-recuperative radiant tube burner assembly 600, receiving the flame from reducer 250 where combustion is completed. Heat is radiated from the three U-tube housing elements 510 and 520 into the vessel that is being heated, for example a kiln or industrial furnace. The flame may expand as it is projected from discharge nozzle into inner flame tube 310 and any additional combustion may be completed as any uncombusted fuel and air combine in this portion of the burner.

As shown in FIG. 6, secondary air tube 222 is formed with a plurality of helical channels 240 formed by helical walls 242 that serve as a conduit for secondary air. These helical walls 242 form closed channels 240 that are bounded passageways when a primary air tube 210 is inserted within secondary air tube 222. The helical walls extend beyond the termination of primary air tube 210. The helical walls 242 essentially act as heat exchanger fins along their entire length. Below the termination of primary air tube 210, the helical channels are no longer completely bounded passageways. It will be understood by those skilled in the art that although the combustor is shown comprising three elements, a primary air tube 210, a secondary air tube 222 having helical walls, and a reducer, these elements may be combined to form a single piece or as a single tube having the requisite characteristics coupled to a reducer.

Air is introduced into the channels at a preselected location at the first end 610 of self-recuperative single-ended tube burner 600. The air may be introduced axially or radially or both. The method of introduction of air is not a part of this invention. However, as exhaust gases exit the burner at first end 610, air should be introduced in any satisfactory manner that does not interfere with the discharge of exhaust gases. The air enters helical channels 240 which run the length of tube 222 in the preferred embodiment. It will be understood that the helical channels are not required to extend the entire length of tube 222 to be effective, nor are the walls 242 required to extend the entire length of tube 222. However, as the walls 242 act as fins, a maximum of efficiency is obtained when they extend the entire length of tube 222. One alternative embodiment includes walls 242 that are not helical at first end 610 of burner assembly 600, but which become helical at or near the termination of tube 210. Another embodiment includes no walls 242 along tube 222 toward first end 510, but helical walls 242 are included between primary air tube 210 and secondary air tube 222 at an intermediate location along the length of tube 210 away from first end 610 of burner assembly 600. Other configurations of the walls 242 and channels 240 similarly are within the scope of the invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A self-recuperative radiant tube burner assembly with improved flame stability comprising:

a U-tube housing having a first substantially linear tube housing element, a second substantially linear tube housing element and a toroidal tube housing element, said first housing element having a first and a second end, said second housing element having a first and a second end, said third toroidal housing element having a first end and a second end, said second end of the first housing element being joined to the first end of the toroidal housing element, said second end of the second housing element being joined to the second end of the toroidal housing element, the U-tube housing having a central axis extending between the first end of the first housing element and the first end of the second housing element;

two flame holders for a diffusion flame burner, each flame holder having a first end and a second end, wherein the two flame holders are capable of holding a substantially equivalent flame of combustion simultaneously during normal burner operation;

a first flame holder being positioned in the first end of the first housing element and a second flame holder being positioned in the first end of the second housing element;

the first flame holder having a first inner flame tube axially spaced from the second end of the flame holder by a gap and positioned at the second end of the first housing element; and the second flame holder having a second inner flame tube axially spaced from the second end of the first flame holder by a gap and positioned at the second end of the second housing element.

2. A self-recuperative radiant tube burner assembly with improved flame stability comprising:

a U-tube housing having a first substantially linear tube housing element, a second substantially linear tube housing element and a toroidal tube housing element, said first housing element having a first and a second end, said second housing element having a first and a second end, said third toroidal housing element having a first end and a second end, said second end of the first housing element being joined to the first end of the toroidal housing element, said second end of the second housing element being joined to the second end of the toroidal housing element, the U-tube housing having a central axis extending between the first end of the first housing element and the first end of the second housing element;

two flame holders for a diffusion flame burner, each flame holder having a first end and a second end;

a first flame holder being positioned in the first end of the first housing element and a second flame holder being positioned in the first end of the second housing element;

the first flame holder having a first inner flame tube axially spaced from the second end of the flame holder by a gap and positioned at the second end of the first housing element; and the second flame holder having a second inner flame tube axially spaced from the second end of the first flame holder by a gap and positioned at the second end of the second housing element, a secondary air tube axially extending from the first end of the flame holder toward the second end of the flame holder, the secondary air tube having an inside diameter and an outside diameter;

a primary air tube extending from the first end of the flame holder toward the second end of the flame holder, the primary air tube being coaxial with the secondary air tube along at least a portion of the secondary air tube, the primary air tube having an outside diameter that is smaller than the inside diameter of the secondary air tube, the secondary air tube extending beyond a terminus of the primary air tube toward the second end of the flame holder;

a fuel tube extending beyond the terminus of the primary air tube at the second end of the flame holder, the fuel tube having an outside diameter that is smaller than the inside diameter of the primary air tube and coaxial with the primary air tube along at least a portion of a central axis of the primary air tube at the second end of the flame holder, the fuel tube including a plurality of radially oriented apertures;

an axially oriented reducer positioned at the second end of the flame holder coupled to the secondary air tube;

a plurality of helical walls extending between the inside diameter of the secondary air tube and the outside diameter of the primary air tube, the plurality of helical walls, the inside diameter of the secondary air tube and the outside diameter of the primary air tube forming closed helical channels, and the inside diameter of the secondary air tube and the plurality of helical walls forming open helical channels for at least a portion of the secondary air tube axially extending beyond the primary air tube at the second end of the flame holder; and the helical channels imparting a swirl to secondary air from the secondary air tube mixing with fuel from the fuel tube to form stationary vortices of a fuel and air mixture to form flamelets that stabilize a flame upon an ignition sequence; and a combustion zone formed by the at least a portion of the secondary air tube that axially extends beyond the primary air tube at the second end of the flame holder and the reducer coupled to the secondary air tube wherein combustion of a fuel and air mixture is propagated by the flamelets.

3. The U-tube burner assembly of claim 2, wherein a pitch of the helical channels is sufficient to swirl secondary air to cause formation of the stationary vortices.

4. The U-tube burner assembly of claim 3 wherein the pitch of the helical walls is about one revolution of the inside diameter of the secondary tubes in 12 inches of an axial length of the secondary tubes to about one revolution of the inside diameters of the secondary tubes in 12 inches of the axial lengths of the secondary tubes.

5. The U-tube burner assembly of claim 2 wherein at least the secondary air tubes are further comprised of a material that is thermally shock resistant and suitable for use in an oxidative environment.

6. The U-tube burner assembly of claim 5 further including the primary air tubes and the reducers comprised of a material that is thermally shock resistant and suitable for use in an oxidative environment.

7. The U-tube burner assembly of claim 5 wherein the material is selected from the group consisting of carbon-carbon materials, cordierite, ceramic materials, ceramic composite materials, and ceramic matrix composite materials.

8. The U-tube burner assembly of claim 5 wherein the material is coated with a protective coating.

9. The U-tube burner assembly of claim 5 wherein the ceramic composite material is Si/SiC ceramic.

10. The U-tube burner assembly of claim 6 wherein the material is selected from the group consisting of carbon-carbon materials, cordierite, ceramic materials, ceramic composite materials, and ceramic matrix composite materials.

11. The U-tube burner assembly of claim 2 wherein each primary air tube and secondary air tube are single units comprising a primary air tube joined to a secondary air tube.

12. The U-tube burner assembly of claim 11 wherein each primary air tube and secondary air tube are joined by the respective plurality of helical walls extending from the inside diameter of the secondary air tube to the outside diameter of the primary air tube.

13. The U-tube burner assembly of claim 2 wherein each primary air tube, secondary air tube and reducer are a single unit.

14. The U-tube burner assembly of claim 2 wherein each primary air tube and reducer are a single unit.

15. The U-tube burner assembly of claim 2 wherein the helical walls extend radially inward from at least a portion of each inside diameter of the secondary air tubes.

16. The U-tube burner assembly of claim 2 wherein the helical walls extend radially inward from the inside diameters of the secondary air tubes along their complete axial length.

17. The U-tube burner assembly of claim 2 wherein the plurality of helical walls includes at least 10 channels per set of helical walls.

18. The U-tube burner assembly of claim 2 wherein the velocity of a combustion gas flowing through the housing is increased by modifying the cross-sectional area of the housing.

19. The U-Tube burner assembly of claim 2 wherein sleeves are inserted into the housing to increase the velocity of a combustion gas flowing through the housing by modifying a cross-sectional area of the housing.

20. The U-tube burner assembly of claim 19 wherein the sleeves comprise ceramic.

21. The U-tube burner assembly of claim 19 wherein the sleeves comprise metal.

22. The U-tube burner assembly of claim 19 wherein the sleeves are mechanically fastened to the U-tube housing.

23. The U-tube burner assembly of claim 19 wherein the sleeves are mechanically fastened to the burners.

24. A U-tube burner system having recuperative radiant tube burners with improved flame stability, comprising:

a U-tube housing having a first substantially linear tube housing element, a second substantially linear tube housing element and a toroidal tube housing element, said first housing element having a first and a second end, said second housing element having a first and a second end, said third toroidal housing element having a first end and a second end, said second end of the first housing element being joined to the first end of the toroidal housing element, said second end of the second housing element being joined to the second end of the toroidal housing element, the U-tube housing having a central axis extending between the first end of the first housing element and the first end of the second housing element;

two flame holders for a diffusion flame burner, each flame holder having a first end and a second end;

a first flame holder being positioned in the first end of the first housing element and a second flame holder being positioned in the first end of the second housing element;

the first flame holder having a first inner flame tube axially spaced from the second end of the flame holder by a gap and positioned at the second end of the first housing element; and the second flame holder having a second inner flame tube axially spaced from the second end of the first flame holder by a gap and positioned at the second end of the second housing element;

the first flame holder having a first secondary air tube extending from the first end of the first flame holder toward the second end of the first flame holder, a first fuel tube extending toward the second end of the first flame holder, and a first reducer nozzle positioned at the second end of the first flame holder, the first secondary air tube having an inside diameter surrounding the first fuel tube and an outside diameter, a first passageway defined within the inside diameter of the first secondary air tube for transport of primary air, the first passageway for the transport of primary air terminating at a terminus of the inside diameter of the first secondary air tube, the first reducer nozzle positioned to project a first flame from the first flame holder toward the first inside flame tube;

the second flame holder having a second secondary air tube extending from the first end of the second flame holder toward the second end of the second flame holder, a second fuel tube extending toward the second end of the second flame holder, and a second reducer nozzle positioned at the second end of the second flame holder, the second secondary air tube having an inside diameter surrounding the second fuel tube and an outside diameter, a second passageway defined within the inside diameter of the second secondary air tube for transport of primary air, the second passageway for the transport of primary air terminating at a terminus of the inside diameter of the second secondary air tube, the second reducer nozzle positioned to project a second flame from the second flame holder toward the second inside flame tube;

the first secondary air tube having a first plurality of closed helical channels located between its outside diameter and inside diameter and extending for a first preselected distance along at least a portion of the first secondary air tube terminating beyond the terminus of the inside diameter of the first secondary tube as a first plurality of open helical channels;

the second secondary air tube having a second plurality of closed helical channels located between its outside diameter and inside diameter and extending for a second preselected distance along at least a portion of the second secondary air tube terminating beyond the terminus of the inside diameter of the second secondary tube as a second plurality of open helical channels;

the first plurality of helical channels imparting a first swirl to the first secondary air to stabilize the first flame while a first portion of first exhaust gases is expelled toward the first end of the first housing element through a first gap formed between a first outer boundary comprised of the first flame holder and the first inner flame tube and a first inner boundary comprised of the first housing element and while a second portion of first exhaust gases is expelled toward the first end of the second housing element through the third housing element and through a second gap formed between a second outer boundary comprised of the second flame holder and the second inner flame tube and a second inner boundary comprised of the second housing element; and the second plurality of helical channels imparting a second swirl to the second secondary air to stabilize the second flame while a first portion of second exhaust gases is expelled toward the first end of the second housing element through the second gap and while a second portion of first exhaust gases is expelled toward the first end of the first housing element through the third housing element and through the first gap.

25. The U-tube burner assembly of claim 18 wherein the secondary tubes are comprised of a material that is thermally shock resistant and suitable for use in an oxidative environment.

26. The U-tube burner assembly of claim 19 wherein the material is selected from the group consisting of carbon-carbon materials, cordierite, ceramic materials, ceramic composite materials, and ceramic matrix composite materials.

27. A method for stabilizing flames in a U-tube burner assembly, comprising the steps of:

providing two flame holders, each flame holder having a first end and a second end, the flame holders further comprising:

a secondary air tube extending from the first end of the flame holder toward the second end of the flame holder, the secondary air tube having an inside diameter and an outside diameter, a primary air tube extending from the first end of the flame holder to the second end of the flame holder, the primary air tube being coaxial with the secondary air tube along at least a portion of the secondary air tube and having a terminus within the secondary air tube, the primary air tube having an outside diameter that is smaller than the inside diameter of the secondary air tube, a fuel tube extending beyond the primary air tube at the terminus of the primary air tube within secondary air tube toward the second end of the flame holder, the fuel tube having an outside diameter that is smaller than the inside diameter of the primary air tube and coaxial with the primary air tube along at least a portion of a central axis of the primary air tube at the second end of the flame holder, a portion of the fuel tube extending beyond the primary air tube including a plurality of radially oriented apertures, an axially-oriented reducer positioned at the second end of the flame holder coupled to the secondary air tube, and a plurality of helical walls extending between the inside diameter of the secondary air tube and the outside diameter of the primary air tube for at least a portion of the secondary air tube, the helical walls, the inner diameter of the secondary air tube and the outer diameter of the primary air tube forming closed helical channels, and the inner diameter of the secondary air tube and the helical walls forming open helical channels for at least a portion of the secondary air tube that axially extends beyond the primary air tube at the second end of the flame holder;

providing air to the primary air tube and the secondary air tube;

providing fuel to the fuel tube;

mixing the fuel and the air to form a fuel/air mixture as fuel exits the fuel tube apertures;

igniting the fuel/air mixture to form a flame;

imparting a swirl to secondary air from the secondary air tube mixed with fuel from the fuel tube to form stationary vortices of the fuel/air mixture to form flamelets that stabilize the flame, the flame being combusted in a combustion zone formed by the at least the portion of the secondary air tube that axially extends beyond the primary air tube at the second end of the flame holder and the reducer wherein combustion of a fuel and air mixture is propagated by the flamelets.

28. A flame holder for a diffusion flame burner, the flame holder having a first end and a second end, comprising:

a secondary air tube axially extending from the first end of the flame holder toward the second end of the flame holder, the secondary air tube having an inside diameter and an outside diameter;

a primary air tube extending from the first end of the flame holder toward the second end of the flame holder, the primary air tube being coaxial with the secondary air tube along at least a portion of the secondary air tube, the primary air tube having an outside diameter that is smaller than the inside diameter of the secondary air tube, the secondary air tube extending beyond a terminus of the primary air tube toward the second end of the flame holder;

a fuel tube extending beyond the terminus of the primary air tube at the second end of the flame holder, the fuel tube having an outside diameter that is smaller than the inside diameter of the primary air tube and coaxial with the primary air tube along at least a portion of a central axis of the primary air tube at the second end of the flame holder, the fuel tube including a plurality of radially oriented apertures;

an axially oriented reducer positioned at the second end of the flame holder coupled to the secondary air tube;

a plurality of helical walls extending between the inside diameter of the secondary air tube and the outside diameter of the primary air tube, the plurality of helical walls, the inside diameter of the secondary air tube and the outside diameter of the primary air tube forming closed helical channels, and the inside diameter of the secondary air tube and the plurality of helical walls forming open helical channels for at least a portion of the secondary air tube axially extending beyond the primary air tube at the second end of the flame holder;

the helical channels imparting a swirl to secondary air from the secondary air tube mixing with fuel from the fuel tube to form stationary vortices of a fuel and air mixture to form flamelets that stabilize a flame upon an ignition sequence; and a combustion zone formed by the at least a portion of the secondary air tube that axially extends beyond the primary air tube at the second end of the flame holder and the reducer coupled to the secondary air tube wherein combustion of a fuel and air mixture is propagated by the flamelets.

29. The flame holder of claim 28 wherein a pitch of the helical channels is sufficient to swirl secondary air to cause formation of the stationary vortices.

30. The flame holder of claim 29 wherein the pitch of the helical walls is about one revolution of the inside diameter of the secondary tube in 12 inches of an axial length of the secondary tube to about one revolution of the inside diameter of the secondary tube in 12 inches of the axial length of the secondary tube.

31. The flame holder of claim 28 wherein at least the secondary air tube is further comprised of a material that is thermally shock resistant and suitable for use in an oxidative environment.

32. The flame holder of claim 31 further including the primary air tube and the reducer comprised of a material that is thermally shock resistant and suitable for use in an oxidative environment.

33. The flame holder of claim 31 wherein the material is selected from the group consisting of carbon-carbon materials, cordierite, ceramic materials, ceramic composite materials, and ceramic matrix composite materials.

34. The flame holder of claim 31 wherein the material is coated with a protective coating.

35. The flame holder of claim 31 wherein the ceramic composite material is Si/SiC ceramic.

36. The flame holder of claim 32 wherein the material is selected from the group consisting of carbon-carbon materials, cordierite, ceramic materials, ceramic composite materials, and ceramic matrix composite materials.

37. The flame holder of claim 28 wherein the primary air tube and the secondary air tube are a single unit comprising a primary air tube joined to the secondary air tube.

38. The flame holder of claim 28 wherein the primary air tube and the secondary air tube are joined by the plurality of helical walls extending from the inside diameter of the secondary air tube to the outside diameter of the primary air tube.

39. The flame holder of claim 28 wherein the primary air tube, the secondary air tube and the reducer are a single unit.

40. The flame holder of claim 28 wherein the primary air tube and the reducer are a single unit.

41. The flame holder of claim 28 wherein the helical walls extend radially inward from at least a portion of the inside diameter of the secondary air tube.

42. The flame holder of claim 28 wherein the helical walls extend radially inward from the inside diameter of the secondary air tube along its complete axial length.

43. The flame holder of claim 28 wherein the plurality of helical walls includes at least 10 channels.

44. The flame holder of claim 43 wherein the plurality of helical walls includes at least 16 channels.

45. The flame holder of claim 28 wherein a radial thickness of the secondary air tube is between about 1/8"–1/2".

46. The flame holder of claim 45 wherein the radial thickness of the secondary tube is between about 1/8"–1/4".

47. The flame holder of claim 28 wherein a radial dimension of the plurality of helical walls is between about 1/8"–1/4".

48. The flame holder of claim 28 wherein the helical channels have a circumferential dimension that is about two times a radial dimension of the helical walls.

49. The flame holder of claim 28 further including means for igniting a fuel and air mixture.

50. The flame holder of claim 49 wherein the means for igniting is a sparking device.

51. A recuperative radiant tube burner having improved flame stability, comprising:
   a first end, a second end, and a housing having a central axis extending between the first end and the second end;
   a flame holder, having a first end and a second end, positioned within the first end of the burner and extending axially within the housing toward the second end of the burner;
   an inner flame tube axially spaced from the second end of the flame holder by a gap and positioned at the second end of the housing;
   the flame holder having a secondary air tube extending from the first end of the flame holder to the second end of the flame holder, a fuel tube extending toward the second end of the flame holder, and a reducer nozzle positioned at the second end of the flame holder, the secondary air tube having an inside diameter surrounding the fuel tube and an outside diameter, a passageway defined within the inside diameter of the secondary air tube for transport of primary air, the passageway for the transport of primary air terminating at a terminus of the inside diameter of the secondary air tube, the reducer nozzle positioned to project a flame from the flame holder toward the inside flame tube;
   the secondary air tube having a plurality of closed helical channels located between its outside diameter and inside diameter and extending for a preselected distance along at least a portion of the secondary air tube terminating beyond the terminus of the inside diameter of the secondary tube as a plurality of open helical channels;
   the plurality of helical channels imparting a swirl to the secondary air to stabilize the flame while exhaust gases are expelled toward the first end of the housing through a gap formed between an outer boundary comprised of the flame holder and the inner flame tube and an inner boundary comprised of the housing.

52. The burner of claim 51 wherein the secondary tube is comprised of a material that is thermally shock resistant and suitable for use in an oxidative environment.

53. The burner of claim 52 wherein the material is selected from the group consisting of carbon-carbon materials, cordierite, ceramic materials, ceramic composite materials, and ceramic matrix composite materials.

54. The burner of claim 51 further including an ignition device.

55. A method for stabilizing a flame in a diffusion flame burner, comprising the steps of:
   providing a flame holder having a first end and a second end, the flame holder further comprising:
   a secondary air tube extending from the first end of the flame holder toward the second end of the flame holder, the secondary air tube having an inside diameter and an outside diameter;
   a primary air tube extending from the first end of the flame holder to the second end of the flame holder, the primary air tube being coaxial with the secondary air tube along at least a portion of the secondary air tube and having a terminus within the secondary air tube, the primary air tube having an outside diameter that is smaller than the inside diameter of the secondary air tube;
   a fuel tube extending beyond the primary air tube at the terminus of the primary air tube within secondary air tube toward the second end of the flame holder, the fuel tube having an outside diameter that is smaller than the inside diameter of the primary air tube and coaxial with the primary air tube along at least a portion of a central axis of the primary air tube at the second end of the flame holder, a portion of the fuel tube extending beyond the primary air tube including a plurality of radially oriented apertures;
   an axially-oriented reducer positioned at the second end of the flame holder coupled to the secondary air tube; and
   a plurality of helical walls extending between the inside diameter of the secondary air tube and the outside diameter of the primary air tube for at least a portion of the secondary air tube, the helical walls, the inner diameter of the secondary air tube and the outer diameter of the primary air tube forming closed helical channels, and the inner diameter of the secondary air tube and the helical walls forming open helical channels for at least a portion of the secondary air tube that axially extends beyond the primary air tube at the second end of the flame holder;
   providing air to the primary air tube and the secondary air tube;
   providing fuel to the fuel tube;
   mixing the fuel and the air to form a fuel/air mixture as fuel exits the fuel tube apertures;
   igniting the fuel/air mixture to form a flame; and
   imparting a swirl to secondary air from the secondary air tube mixed with fuel from the fuel tube to form stationary vortices of the fuel/air mixture to form flamelets that stabilize the flame, the flame being combusted in a combustion zone formed by the at least the portion of the secondary air tube that axially extends beyond the primary air tube at the second end of the flame holder and the reducer wherein combustion of a fuel and air mixture is propagated by the flamelets.

* * * * *

UNITED STATES PATENT AND TRADEMARK OFFICE
CERTIFICATE OF CORRECTION

PATENT NO. : 6,872,070 B2
DATED : March 29, 2005
INVENTOR(S) : Moore et al.

It is certified that error appears in the above-identified patent and that said Letters Patent is hereby corrected as shown below:

Column 9,
Line 6, "in 20'." should be -- in 20". --.

Column 10,
Line 37, "520 the" should be -- 520 for the --.

Column 11,
Line 67, "FIG. 5" should be -- FIG. 5. --.

Column 12,
Line 6, "structure 503" should be -- structure 508 --.
Line 19, "FIG. 5 is" should be -- FIG. 5) is --.
Line 22, "FIG. 5 into" should be -- FIG. 5) into --.
Line 33, "206, 50" should be -- 206, so --.

Column 15,
Line 30, "element," should be -- element. --.

Signed and Sealed this

Thirteenth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,872,070 B2
DATED : March 29, 2005
INVENTOR(S) : Moore et al.

It is certified that error appears in the above-identified patent and that said Letters Patent is hereby corrected as shown below:

Column 3,
Line 50, "conical-shape" should be -- conical-shaped --.

Column 4,
Line 35, "semi toroidal" should be -- semi-toroidal --.

Column 8,
Line 14, "form" should be -- from --.

Signed and Sealed this

Fourteenth Day of February, 2006

JON W. DUDAS
*Director of the United States Patent and Trademark Office*

UNITED STATES PATENT AND TRADEMARK OFFICE
CERTIFICATE OF CORRECTION

PATENT NO.         : 6,872,070 B2                                       Page 1 of 1
APPLICATION NO. : 10/301329
DATED              : March 29, 2005
INVENTOR(S)        : Moore et al.

It is certified that error appears in the above-identified patent and that said Letters Patent is hereby corrected as shown below:

In column 14, line 42 "said third toroidal" should be -- said toroidal --;

In column 15, line 8 "said third toroidal" should be -- said toroidal --;

In column 17, line 18 "said third toroidal" should be -- said toroidal --;

In column 18, line 29 "the third" should be -- the toroidal --;

In column 18, line 40 "the third" should be -- the toroidal --.

Signed and Sealed this

Fourteenth Day of November, 2006

JON W. DUDAS
*Director of the United States Patent and Trademark Office*